United States Patent
Terui et al.

[11] Patent Number: 5,978,082
[45] Date of Patent: Nov. 2, 1999

[54] ATOMIC ABSORPTIOMETER AND A METAL SPECIMEN ATOMIC VAPOR GENERATION APPARATUS USED IN THE ATOMIC ABSOROTIOMETER

[75] Inventors: Yasushi Terui; Kazuo Moriya, both of Hitachinaka; Hiromi Yamashita, Ishioka; Hayato Tobe, Mito, all of Japan

[73] Assignee: Hitachi, Ltd., Tokyo, Japan

[21] Appl. No.: 09/014,069

[22] Filed: Jan. 27, 1998

[30] Foreign Application Priority Data

Feb. 5, 1997  [JP]  Japan ................................ 9-022827

[51] Int. Cl.⁶ .................................................. G01N 21/74
[52] U.S. Cl. .......................... 356/311; 356/36; 356/307; 356/312; 422/78; 422/80
[58] Field of Search .................. 356/311, 312, 356/307, 246, 36; 422/78, 80

[56] References Cited

U.S. PATENT DOCUMENTS

| Re. 32,022 | 11/1985 | Parker et al. | 356/307 |
| 4,391,776 | 7/1983 | Braun | 422/78 |
| 5,026,652 | 6/1991 | Huber | 356/36 |
| 5,098,658 | 3/1992 | Huber | 422/78 |

FOREIGN PATENT DOCUMENTS 0400513  12/1990  European Pat. Off. .

*Primary Examiner*—F. L. Evans
*Attorney, Agent, or Firm*—Kenyon & Kenyon

[57] ABSTRACT

The object of this invention is to provide an atomic absorptiometer and a metal specimen atomic vapor generation apparatus used in the atomic absorptiometer, which enable a light absorption measurement based on the Zeeman effect highly capable of background correction and eliminate the need for the troublesome work of dismounting a magnet. For this purpose, the following configuration is employed. First, the specimen, hydrochloric acid, and sodium borohydride are delivered and mixed by the peristaltic pump 10 to produce a metallic hydride. The generated gas-liquid mixture solution is separated by the separator 12 into a specimen gas and liquids. The separated specimen gas is introduced into the heating section 30. Electricity is supplied from the power source 28 to the specimen heating section 30 where the specimen gas introduced is heated and separated into hydrogen and a specimen metal vapor to be measured. The specimen metal vapor is then introduced into the measuring section 34 arranged between magnetic poles of the magnet 32 where the metal vapor is subjected to the atomic absorptiometric analysis based on the Zeeman effect.

7 Claims, 2 Drawing Sheets

ATOMIC ABSORPTIOMETER AND A METAL SPECIMEN ATOMIC VAPOR GENERATION APPARATUS USED IN THE ATOMIC ABSOROTIOMETER

FIELD OF THE INVENTION

The present invention relates to an atomic absorptiometer and a metal specimen atomic vapor generation apparatus used in the atomic absorptiometer, and more specifically to a background correction type atomic absorptiometer that enables measurement of light absorption by utilizing the Zeeman effect and to a metal specimen atomic vapor generation apparatus used in the atomic absorptiometer.

BACKGROUND OF THE INVENTION

The flame atomic absorptiometry has excellent features of being able to perform measurements easily and with high sensitivity because it has a short analysis time and is little influenced by chemical interference. It can measure as many as 80 kinds of atoms and has a wide range of applications including measurement of impurities in steels and trace metals in food, and measurement of trace metal components in environmental specimens. As a growing number of regulatory limits are being changed in an environmental analysis field these days, the role of the flame atomic absorptiometric analysis apparatus is expanding.

An example analysis method with a particularly wide range of applications is a metallic hydride generation analysis method. This method is capable of determining a trace amount of hazardous metals such as arsenic and selenium, and is a common analysis technique widely used in the management of clean water and waste water and in environmental fields. This method first transforms an objective metal in a specimen solution into a gaseous hydride by chemical reaction. The hydride is then introduced into a cell made of quartz, which is heated by a flame of the flame atomic absorptiometer. The hydride in the cell on heating is dissolved into hydrogen and a vapor of the metal being measured. This specimen metal vapor is measured by the atomic absorptiometry.

Most of the hydrides generated by chemical reactions can be measured and determined with a very high sensitivity (sub ppb) because their evaporation temperatures are low. This analysis method, however, has the drawback that because the quartz cell cannot be placed in the magnetic field, measurements need to be done by a method without a background correction (single beam measurement) or a D2 method with a degraded background correction capability.

The configuration of a conventional flame atomic absorptiometer is shown in FIG. 2. Measurement of hydrides with this absorptiometer is performed as follows.

A solution of a specimen containing metals to be measured, such as arsenic and selenium, hydrochloric acid and sodium borohydride is prepared and then delivered and mixed by a peristaltic pump 10. The mixed metals to be measured react to become a hydride. The hydride thus obtained is introduced into a gas-liquid separation unit 12 called a separator where it is separated into a specimen gas to be measured and others. The specimen gas is fed through a specimen introducing pipe 14 into a quartz cell 16, in which it is heated by a flame 20 of the flame atomic absorptiometer and evaporated into an atomic vapor. A beam emitted from a light source, for example, a hollow cathode lamp 18, is passed through the cell 16. The hollow cathode lamp 18 emits a beam 24 having a line spectrum of an element being measured. As this measuring beam penetrates through the specimen atomic vapor, light absorption takes place. The beam is then scattered by a spectroscope 22 into a spectrum which is detected by a detector 26 for atomic absorption measurement.

The drawback of this measuring method is that because the measurement is made by using a quartz cell about 16 mm in diameter, the distance between magnetic poles must be set to more than 16 mm to perform the light absorption measurement with background correction utilizing the Zeeman effect and it is difficult to realize a magnet of such a large size. Further, because the heating section and the measuring section are the same, locating the cell between the magnetic poles results in the magnet being heated, too, which makes this configuration impracticable.

For the reasons mentioned above, it is conventionally impossible to arrange the cell in the magnetic field and there is no alternative but to use a single beam method or a D2 method with a degraded background correction capability. This has given rise to various problems in measurement, such as variations in absorption intensity, caused by base line variations and wavering of flame on the optical path. It is also necessary to dismount and remount the magnet as heavy as 10 kg in performing measurement.

SUMMARY OF THE INVENTION

The object of this invention is to provide an atomic absorptiometer and a metal specimen atomic vapor generation apparatus used in the atomic absorptiometer, which enable a light absorption measurement based on the Zeeman effect highly capable of background correction and eliminate the need for the troublesome work of dismounting a magnet.

According to one aspect, this invention is characterized in that the atomic absorptiometer, which generates a specimen atomic vapor by heating a specimen gas and measures light absorption of the generated specimen atomic vapor, comprises: a heating section to heat the specimen gas to generate the specimen atomic vapor; and a measuring section communicating with the heating section to receive the generated specimen atomic vapor from the heating section; wherein the specimen atomic vapor introduced into the measuring section is measured for light absorption.

According to another aspect, this invention is characterized in that the atomic absorptiometer includes a generation means to generate a metal specimen gas, a heating means to heat the generated metal specimen gas to produce a metal specimen atomic vapor, and a measuring means connected to the heating means to measure the metal specimen atomic vapor generated in the heating section.

In the conventional apparatus, the cell portion has two functions of the heating section for specimen atomic vapor generation and of the measuring section for light absorption measurement, whereas in this invention the heating section and the measuring section are separated. This configuration eliminates the need to heat the measuring section and provide a heating device to the measuring section, which in turn allows the measuring section to be arranged in a magnetic field, making it possible to perform a light absorption measurement based on the Zeeman effect highly capable of background correction. The light absorption measurement based on the Zeeman effect can also be done without having to remove a magnet as is required by the conventional apparatus.

The specimen under measurement is heated by a heat source such as flame to be evaporated into an atomic vapor, which is subjected to the atomic absorption measurement. This heating and measuring processes are done in the heating and measuring section in the conventional apparatus. This invention has this heating and measuring section separated into the heating section and the measuring section and thereby obviates the need for directly heating the measuring section. This in turn enables measurement without dismounting the magnet as required by the conventional apparatus.

Because the configuration of this invention allows the measuring section to be arranged in the magnetic field, the Zeeman effect having high precision in the background correction can be used.

DESCRIPTIONS OF THE PREFERRED EMBODIMENTS

Figure 1:
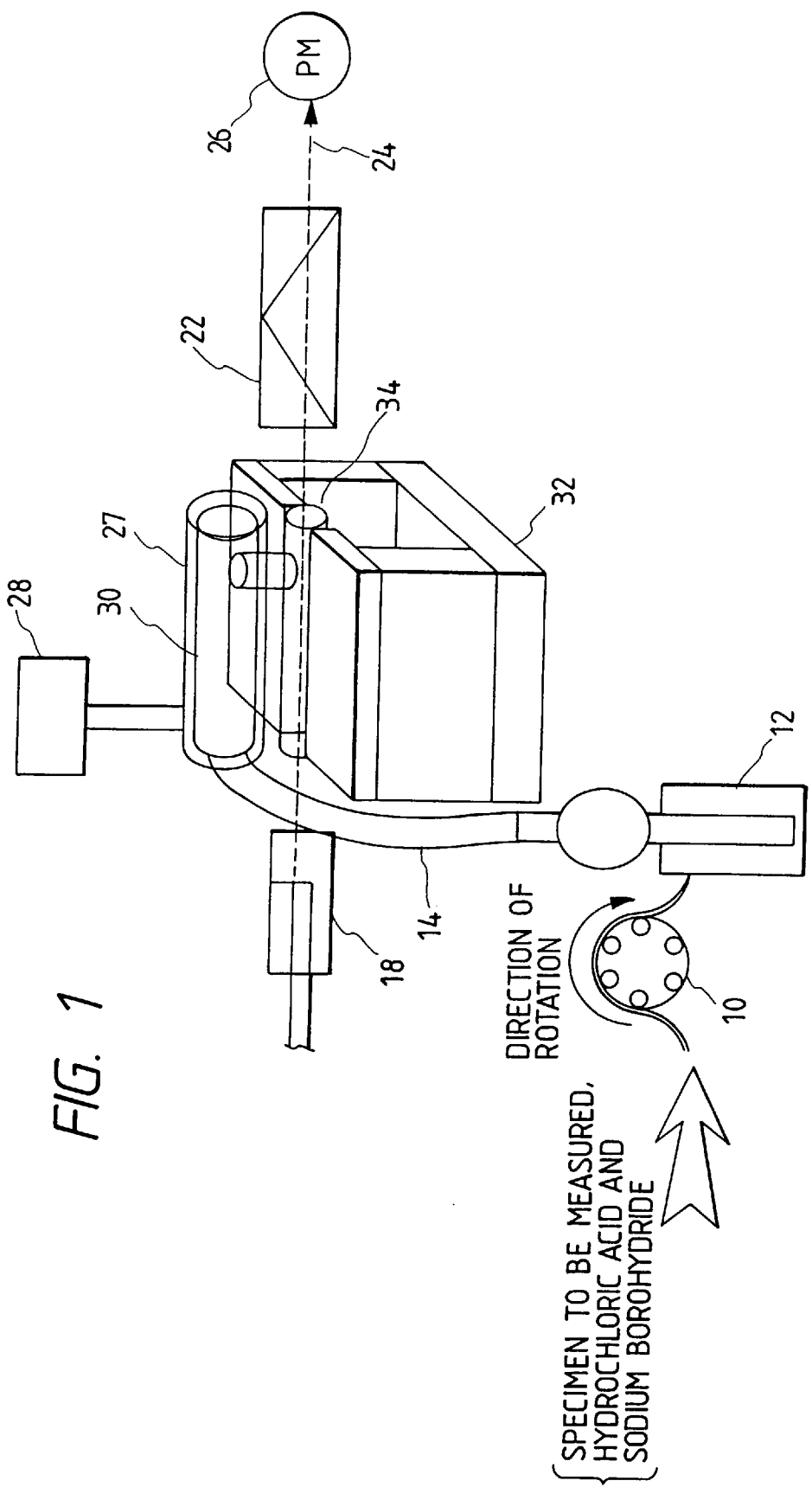
FIG. 1 is a schematic perspective view showing the configuration of an atomic absorptiometer as one embodiment of this invention.
Figure 2:
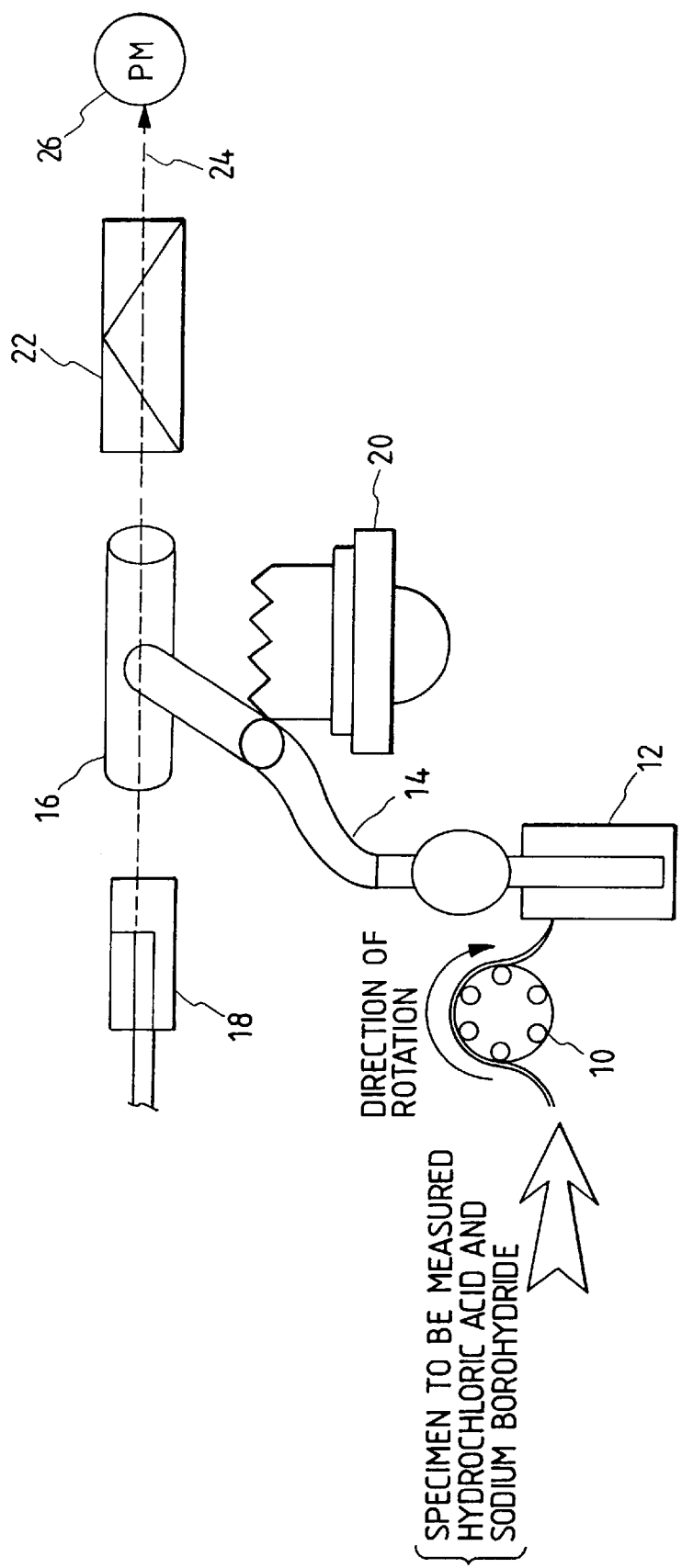
FIG. 2 is a schematic configuration of a conventional atomic absorptiometer.

FIG. 1 shows one embodiment of the atomic absorptiometer according to this invention. The hydride generation method used in this embodiment is a kind of the flame atomic absorptiometry. The flame atomic absorptiometry is an element analysis method that measures a metal atom in a solution or gaseous specimen by heating the specimen to evaporate it into an atomic vapor.

The specimen to be measured, hydrochloric acid and sodium borohydride are delivered and mixed by a peristaltic pump 10 to produce a hydride of the objective metal to be measured. The generated gas-liquid mixture solution is introduced into a separator 12 where it is separated into a specimen gas to be measured and liquids. The separated specimen gas is supplied through a specimen introducing pipe 14 into a container made of quarts in a heating section 30. The container is bonded with an electric heater 27 consisting of two or more platelike ceramic heaters around its outer circumference. The quartz container may be a cylindrical one (17 mm in outer diameter and 15 mm in inner diameter, for example). The electric heater 27 may be wound around the outer circumference of the quartz container. The electric heater 27 is supplied from a power source 28 and heats the quartz container and therefore the specimen gas introduced into it to more than 900° C., for example 1000° C., to separate the specimen gas into hydrogen and a vapor of the metal under measurement. The specimen metal vapor is then transferred through a cylindrical quartz junction tube (9 mm in outer diameter and 7 mm in inner diameter) to a cylindrical quartz cell (9 mm in outer diameter and 7 mm in inner diameter) in a measuring section 34. The cell is situated between poles of a magnet 32 used to produce the Zeeman effect.

Light emitted from a hollow cathode lamp 18 as a light source passes through the cell of the measuring section 34. The hollow cathode lamp emits a beam 24 having a line spectrum of the element to be measured. When the beam penetrates through the atomic vapor, light absorption occurs. Then the beam is introduced into a spectroscope 22 to produce a spectrum, which is then detected by a detector 26 that performs atomic absorption measurement on the atomic vapor of the metal. Because the cell is located in a magnetic field, the light incident on the cell is separated into a component parallel to the field (π component) and a component perpendicular to the field (σ component) by the Zeeman effect.

The parallel component is absorbed by both the specimen metal atomic vapor and the background component including molecules and particles, while the perpendicular component is little absorbed by the specimen metal atomic vapor but is absorbed by the background component. Thus, by taking the difference between the parallel component and the perpendicular component, a background-corrected, accurate light absorption measurement is obtained.

Since the light absorption measurement utilizing the Zeeman effect is well known, further explanation of the absorptiometry will not be given here. In the conventional apparatus the heating section 30 and the measuring section 34 are the same. In the embodiment of this invention, on the other hand, the heating section 30 and the measuring section 34 are separated, the specimen to be measured is evaporated into an atomic vapor with the heating section 30 arranged outside the area between the magnetic poles, and the atomic vapor is introduced into the measuring section 34 between the magnetic poles where it is subjected to the atomic absorptiometric analysis with the Zeeman background correction. This method eliminates the need to dismount or remount a magnet as heavy as 10 kg during the measurement of hydride as is required by the conventional equipment, thus enhancing the safety of the equipment during use. Further, this embodiment allows measurement based on the Zeeman effect highly capable of background correction. Moreover, because the heating section is electrically heated, deterioration of measuring accuracy that would otherwise be caused by the wavering of the flame can be prevented.

With this invention, it is possible to provide an atomic absorptiometer and a metal specimen atomic vapor generation apparatus used in the atomic absorptiometer, which enable an absorptiometric measurement based on the Zeeman effect highly capable of background correction and eliminate the need to dismount a magnet, a troublesome work.

What is claimed is:

1. An atomic absorptiometer, which generates a specimen atomic vapor by heating a hydride gas and measures light absorption of the generated specimen atomic vapor, comprising:

a heating section adapted to heat the hydride gas to generate the specimen atomic vapor;

an unheated measuring section to receive the generated specimen atomic vapor from the heating section;

a connecting section establishing communication between the heating section and the measuring section; and a magnetic field generating section establishing a magnetic field for the measuring section;

wherein the heating section and the measuring section are arranged in parallel and the specimen atomic vapor introduced to the measuring section through the connecting section from the heating section is measured for light absorption.

2. An atomic absorptiometer according to claim 1, wherein the heating section includes a container, into which the hydride gas is introduced and which communicates with the measuring section to supply the generated specimen atomic vapor to the measuring section, and a heater to heat the container, wherein the measuring section includes a cell into which the specimen atomic vapor is supplied from the container, and wherein the container of the heating section, the cell, and the connecting portions between the container and the cell are made of quartz.

3. An atomic absorptiometer according to claim 2, wherein the heater includes an electric heater.

4. An atomic absorptiometer according to claim 1, further including a generation section to generate a metal hydride gas.

5. A metal specimen atomic vapor generation apparatus used in an atomic absorptiometer, the atomic absorptiometer including a generation section to generate a metal hydride gas, a heating section adapted to heat the generated metal hydride gas to produce a metal specimen atomic vapor, an unheated measuring section to measure the metal specimen atomic vapor generated in the heating section; a connecting section establishing communication between said heating section and the measuring section, and a magnetic field generating section to establish a magnetic field for the measuring section; wherein the heating section includes a container, into which the metal hydride gas is introduced and which communicates with the measuring section through the connecting section to supply the generated metal specimen atomic vapor to the measuring section, and a heater to heat the container; wherein the measuring section includes a cell into which the specimen atomic vapor is supplied from the container; through the connecting section; and wherein the container of the heating section, the cell, and the connecting section between the container and the cell are made of quartz.

6. A metal specimen atomic vapor generation apparatus used in an atomic absorptiometer according to claim 5, wherein the heater includes an electric heater.

7. A metal specimen atomic vapor generation apparatus used in an atomic absorptiometer according to claim 5, wherein the generation section to generate the metal hydride gas includes a separator to separate by chemical reactions a metal hydride specimen solution into the metal hydride gas and liquids.

* * * * *